E. R. HIBBARD.
LOCK NUT.
APPLICATION FILED DEC. 5, 1914.
1,266,263.
Patented May 14, 1918.
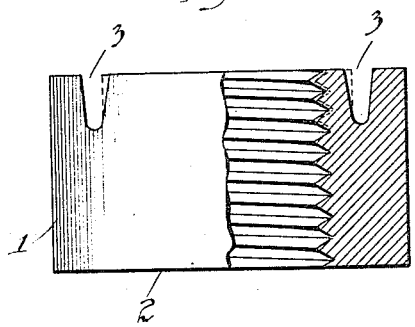
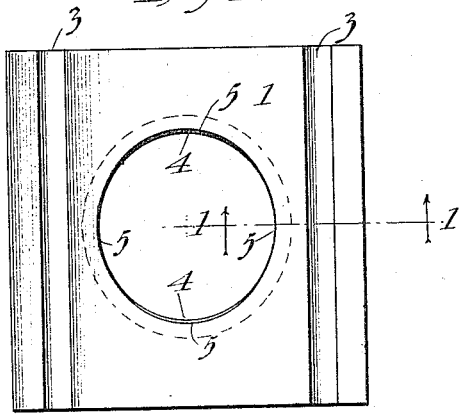
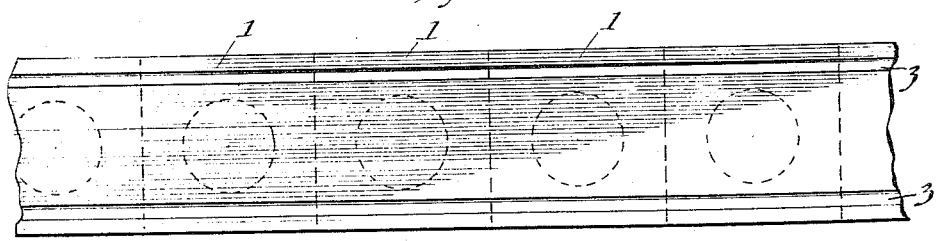
Witnesses:
Arthur W. Carlson
Robert H. Weir
Inventor:
Edward R. Hibbard
by Hiee & Hiee
Attys.

UNITED STATES PATENT OFFICE.

EDWARD R. HIBBARD, OF OAK PARK, ILLINOIS, ASSIGNOR TO GRIP NUT COMPANY, OF CHICAGO, ILLINOIS, A CORPORATION OF ILLINOIS.

LOCK-NUT.

1,266,263.  Specification of Letters Patent.  Patented May 14, 1918.

Application filed December 5, 1914. Serial No. 875,611.

*To all whom it may concern:*

Be it known that I, EDWARD R. HIBBARD, a citizen of the United States of America, residing at Oak Park, in the county of Cook and State of Illinois, have invented certain new and useful Improvements in Lock-Nuts, of which the following is a description.

My invention belongs to that general class of devices known as grip nuts, which are so constructed that while they may be readily threaded upon a coöperating bolt, the turning of the nut down upon the bolt causes the two to so bind or grip one another as to prevent the accidental disengagement of the nut caused by vibration when in use.

My invention consists in the novel construction, and the process of producing the same, herein shown and described, and more particularly pointed out in the claim.

In the drawings, wherein like reference characters indicate like or corresponding parts, Figure 1 is a top plan view of my improvement;

Fig. 2 is an edge view, partly broken away to more clearly show the construction;

Fig. 3 is a plan view of the bar of metal from which the nut blanks may be cut;

Fig. 4 is a plan view of a slightly modified form, embodying the same features of novelty.

In the drawings, 1 represents a bolt nut, which on one face as at 2 is normal in every respect, the bolt hole being substantially a true circle in the usual manner, that is, the threaded part is substantially circular to engage the bolt. The other face of the nut is provided with at least one, and preferably two, substantially parallel grooves 3—3, one of which is positioned on each side of the bolt hole between the margin of the blank and the hole.

After the nut is properly threaded, a suitable tool engaging the walls of the grooves on either side, slightly compresses the same, causing the metal to yield in the line of least resistance and causing the bolt hole to assume a slightly oval form, as indicated. As shown in Fig. 1, 4—4 may indicate the normal wall of the bolt hole, while 5—5 will indicate the abnormal. By this process the diameter of the hole across the grooves is slightly reduced, that is, the diameter across the oval is less than the normal diameter of the bolt hole, and consequently less than the normal diameter of the bolt hole on the opposite side of the nut. It will thus be seen that the nut may be readily threaded upon the bolt at the face 2 with the ordinary finger fit, but as the nut is turned down upon the bolt it will reach the point where the diameter of the bolt hole is reduced, as stated, and thence bind upon the bolt, causing a tight fit, and so gripping the bolt that it may not be accidentally disengaged.

As stated, one groove may be sufficient to secure satisfactory results, although in practice I have found it more desirable to employ two, as indicated. If it is desired the threaded nuts may be first passed through a heating oven to render them more workable and requiring less power to distort them, as stated.

Fig. 4 is a plan view of a modification in which the face of the nut is also provided with grooves 6—6 transverse to the grooves 3—3. The walls of the nut may thus be compressed in two directions, distorting the bolt hole, which tends to approach a square, and causing the nut to bind on the bolt at that point.

Having thus described my invention, what I claim as new and desire to secure by Letters Patent is:—

A lock nut, comprising a blank having substantially parallel faces transverse to the bolt hole with the usual screw-threaded bolt hole formed therein, one face of the nut having substantially parallel grooves the full width of the nut arranged one on each side of the bolt hole, with the thinned walls of the bolt hole transversely to the grooves between the grooves and the hole slightly bent inward to shorten the diameter of the bolt hole in one direction and slightly ovalize the same.

In testimony whereof, I have hereunto signed my name in the presence of two subscribing witnesses.

EDWARD R. HIBBARD.

Witnesses:
JOHN W. HILL,
CHARLES I. COBB.